R. R. JONES.
Wheels for Vehicles.
No. 143,077. Patented September 23, 1873.
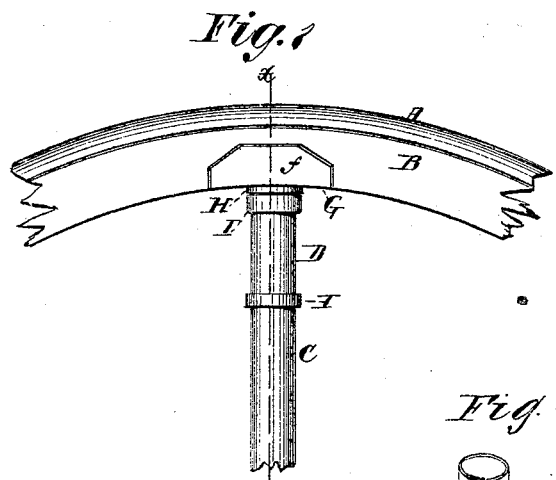
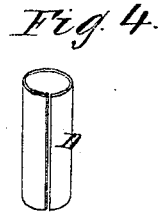
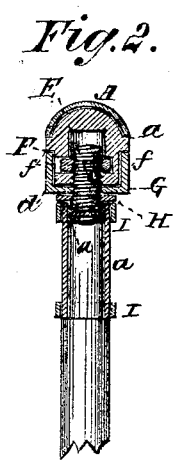
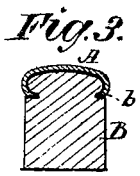
Witnesses:
Inventor:
R. R. Jones
Per _____
Attorneys.

UNITED STATES PATENT OFFICE.

ROLLA R. JONES, OF PILLAR POINT, NEW YORK.

IMPROVEMENT IN WHEELS FOR VEHICLES.

Specification forming part of Letters Patent No. 143,077, dated September 23, 1873; application filed May 24, 1873.

CASE A.

*To all whom it may concern:*

Be it known that I, ROLLA R. JONES, of Pillar Point, in the county of Jefferson and State of New York, have invented a new and useful Improvement in Wagon-Wheels, of which the following is a specification:

A represents the tire; B, the felly; C, the spoke; D, the metal socket for connecting the spoke to the felly; E, a screw; F, the nut in the felly; and G, the cap applied to the felly. The tire is semicircular in form, as in Figure 2, or has its edges bent inward, so as to enter grooves in the felly, as in Fig. 3. The nut F is inserted in an open cavity, $d$, in the felly. A sheet-metal cap, G, is then applied over the felly at that point, and its flange $f$ covers the lateral opening of said cavity. The screw E, having a head, $b$, passes through nut F and cap G, as shown. The end of the spoke-tenon rests or abuts on the screw-head. The sheet-metal socket D is divided longitudinally to adapt it to be fitted over the screw-head, and is tightly clamped around the nut $b$ and around the spoke-tenon by rings or bands I. A leather washer, H, is arranged between the screw-head $b$ and the cap G to lessen wear, and also the shock from concussions, &c.

When it is desired to disconnect the felly and spokes, the bands I are slid off the socket D, and the latter may then be sprung off the head $b$ of the screw E $b$.

Having thus described my invention, what I claim as new, and desire to secure by Letters Patent, is—

1. The combination of divided socket D with the screw E $b$, nut F, felly B, and spoke C, said parts being arranged as shown and described.

2. The combination of cap G, having flanges $f$, with the nut F and felly B, having open recess for said nut, as set forth.

ROLLA REES JONES.

Witnesses:
  WAKEMAN J. DIBBLE,
  LYMAN ACKERMAN.